June 22, 1954    R. J. GALE    2,681,764
HYPERBOLIC ANALOGUE COMPUTER
Filed March 6, 1952    2 Sheets-Sheet 1

*INVENTOR.*
RICHARD J. GALE
BY
*Harry M. Saragovitz*
*Attorney*

June 22, 1954

R. J. GALE 2,681,764

HYPERBOLIC ANALOGUE COMPUTER

Filed March 6, 1952

INVENTOR.
RICHARD J. GALE
BY
Harry M. Saragovitz
Attorney

Patented June 22, 1954

2,681,764

UNITED STATES PATENT OFFICE 2,681,764

HYPERBOLIC ANALOGUE COMPUTER

Richard J. Gale, Belmar, N. J., assignor to the United States of America as represented by the Secretary of the Army Application March 6, 1952, Serial No. 275,211

6 Claims. (Cl. 235—61)

(Granted under Title 35, U. S. Code (1952), sec. 266)

This invention described herein may be manufactured and used by or for the Government for governmental purposes, without payment of any royalty thereon.

This invention relates to a hyperbolic navigation system and has particular reference to an analogue computer for simulating the conditions of distances and bearings which exist in the actual hyperbolic navigation system to indicate continuously the geographical location of a mobile receiver.

In hyperbolic navigation systems, it has long been the practice to utilize electro-mechanical components or digital devices to determine the presentation of a position, or hyperbolic-fix, of a mobile receiver which may be mounted on motor vehicles, surface ships, or aircraft. Such electromechanical components impose weight limitations and response times which usually cannot be tolerated. Digital devices are inherently large because of complexity and are therefore unsuitable for "packaged" installations.

It is therefore an object of my invention to provide a relatively simple, light, efficient, all-electronic apparatus for determining the hyperbolic fix of a mobile receiver.

It is a further object of my invention to provide an analogue computer for determining the position, or hyperbolic-fix, of a mobile receiver by the solution of certain vector relationship which simulate distances and bearings existing in the actual hyperbolic navigation system.

It is yet a further objecting of my invention to provide an analogue computer utilizing the property of a "floating neutral" in an unbalanced three-phase Y-connected load for the determination of a hyperbolic-fix.

For a better understanding of the present invention, together with other and further objects thereof, reference is had to the following description taken in connection with the accompanying drawings in which.

In accordance with the present invention there is provided an analogue computer adapted to simulate the conditions and bearing existing in an actual hyperbolic type of navigational system having a master transmitter and at least two slave transmitters. The analogue computer includes two three-phase systems, initially balanced, each having a line voltage vector proportional to one of the baseline distances between the master transmitter and one slave transmitter. Means are provided in series with one of said systems whereby the voltage vector diagrams of both systems are angularly displaced by an amount corresponding to the angular displacement of the baselines. Each three-phase system includes at least two phase impedances having variable characteristics. Each system includes means for producing a voltage equal to, or proportional to, the difference in magnitude of the phase voltages across the respective variable impedances, means for comparing this difference voltage with a predetermined potential to generate an error voltage and feedback means for nulling out this error voltage. The predetermined potentials are proportional to discrete time difference signals resulting from the output of a mobile receiver operatively associated with the transmitters of the hyperbolic navigation system. Dual feed-back means are provided for maintaining the magnitude of the phase voltages across one variable impedance in each system constant and equal at all times regardless of the variation in either or both of them. The relative phase and magnitude of the voltage developed across either of the variable phase impedances is a function of the hyperbolic-fix or position of the mobile receiver.

Figure 1:
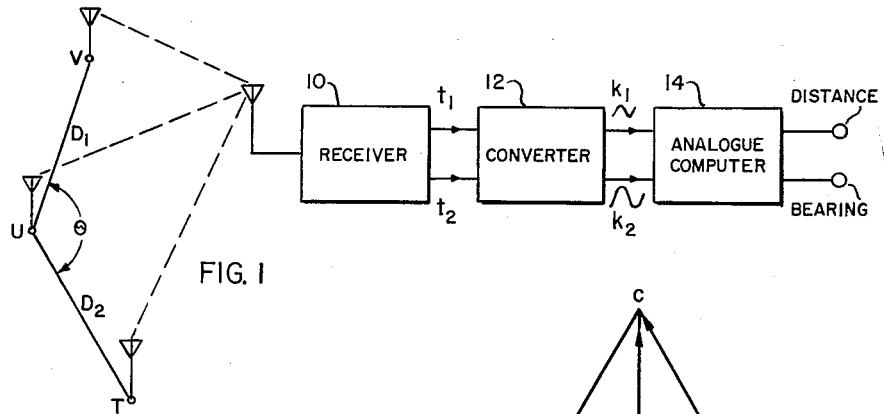
Fig. 1 is a block diagram illustrating a hyperbolic navigation system.
Figure 2:
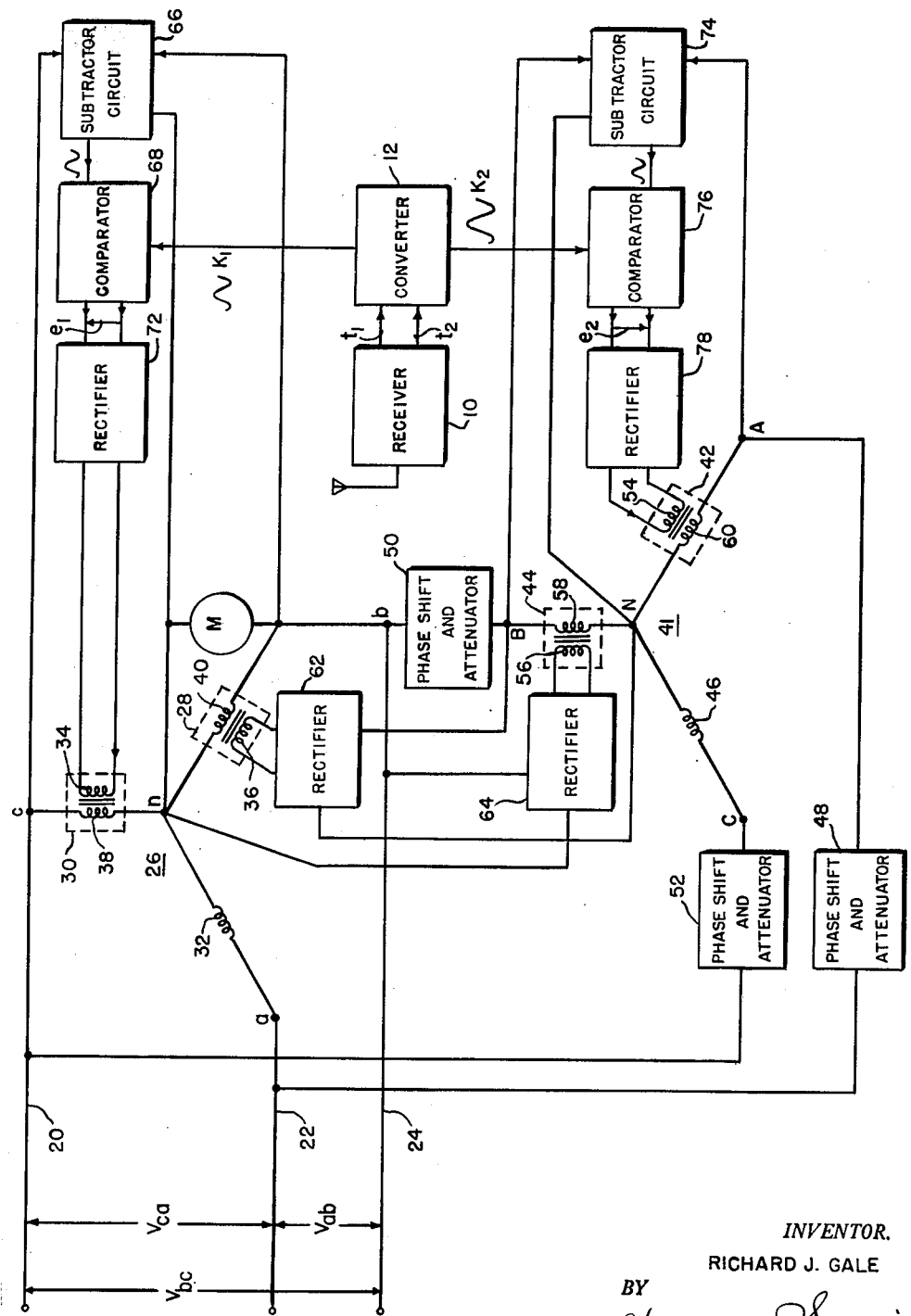
Fig. 2 is a schematic diagram of the analogue computer embodying my invention.

Referring now to the drawings, Fig. 1 shows a block diagram illustrating the mode of operation of a hyperbolic navigation system which may be simulated by my invention. As is shown therein, the system includes three radio frequency transmitter stations identified respectively by the letters T, U and V. Transmitter U may be considered the "master" transmitter and transmitters T and V may be considered the satellite or "slave" transmitters spaced from master transmitter U at predetermined distances may be represented by lines $D_1$ and $D_2$, hereinafter referred to as "baselines," angularly displaced by the angle $\theta$. Conventional operational procedure involves the measurement at a mobile receiver 10 of the difference in the time of arrival of the signals transmitted from master transmitter U and each of the slave transmitters. For each time difference, a line position for the mobile receiver may be located, each such line of position being a hyperbola having the location of the master transmitter and either of the slave transmitters as its focal points. Assuming the velocity of propagation of the radio signals in the navigation system to be constant, the time difference of arrival of these signals from the master and slave transmitters is proportional to the distances of the mobile receiver 10 from the respective transmitting stations. The two measured time differences $t_1$ and $t_2$ from receiver 10 may be applied to a converter 12 for producing discrete potentials $K_1$ and $K_2$ having three-phase line frequency and being of a magnitude proportional to said time differences. The converter output potentials are applied to analogue computer 14 as unbalancing signal voltages. As explained hereinbelow, analogue computer 14 simulates the distances and bearings of mobile receiver 10 so that the geographical location thereof may be indicated continuously. Fig. 2 schematically illustrates the structure of analogue computer 14.

Figure 3:
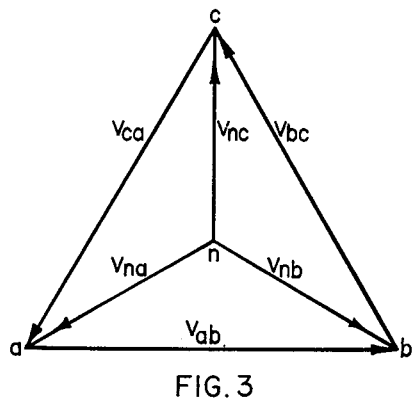
Fig. 3 is a vector diagram of a balanced three-phase load embodied in my invention.

Referring now to Fig. 2, there is shown at 20, 22 and 24 the three wire conductors of a three-phase line voltage source (not shown). A first balanced load 26 comprising Y-connected network impedances 28, 30, 32 having a common junction point $n$ is conventionally connected across the three output terminals $c$, $b$ and $a$ of wire conductors 20, 22 and 24, respectively. The line and phase voltage vector diagram of balanced load 26 is shown in Fig. 3, the vectors $Vab$, $Vbc$ and $Vca$ designating the respective line voltages, and the vectors $Vnb$, $Vnc$ and $Vna$ designating the respective phase voltages. The magnitude of the line voltage source may be so chosen that the line voltage vectors of Fig. 3 are proportional in magnitude to the base line length $D_1$ described hereinabove in Fig. 1. Phase impedances 28 and 30 of balanced load 26 comprise saturable reactors having respective primary windings 34 and 36 and respective secondary windings 38 and 40. As shown, secondary winding 38 of saturable reactor 30 is connected between junction point $n$ and conductor output terminal $c$ and secondary winding 40 of saturable reactor 28 is connected between junction point $n$ and conductor output terminal $b$. These reactors are so arranged and constructed that direct-current flowing in primary windings 34 and 36 will control only the magnitude of the phase impedance of secondary windings 38 and 40, respectively.

A second balanced load 41 comprising Y-connected network impedances 42, 44 and 46 having a common junction point N is connected across wire output terminals $c$, $b$ and $a$ through discrete phase-shifting and attenuating networks 48, 50 and 52. As shown, phase-shifting and attenuating network 48 in connected between conductor terminal $a$ and the free end of A of impedance 42; network 50 is connected between conductor terminal $b$ and free end B of impedance 44; and network 52 is connected between conductor terminal $c$ and free end C of impedance 46. Impedances 42 and 44 comprise saturable reactors having respective primary windings 54 and 56 and respective secondary windings 60 and 58. Secondary windings 60 and 58 are connected between junction points N and free end terminals B and A, respectively. Reactors 42 and 44 are so arranged and constructed that direct current flowing in primary windings 54 and 56 will control only the magnitude of the phase impedance across secondary windings 60 and 58 respectively. It is essential that saturable reactors 28, 30, 42 and 44 of both Y-networks be similar in construction and have similar characteristics.

Figure 4:
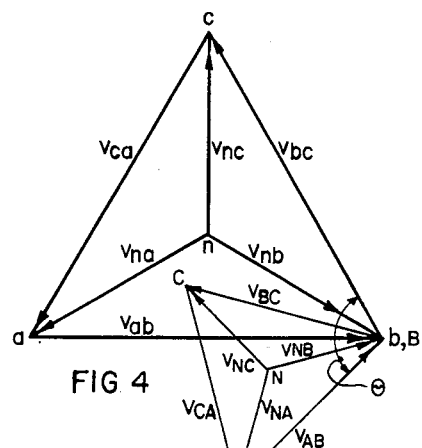
Fig. 4 illustrates the static vector relationship of the phase voltages embodied in my invention under balanced load conditions to simulate the geometry of the actual hyperbolic navigation system.

The magnitude of the phase-shift of each of the networks 48, 50 and 52 is so chosen that the line voltage vector diagrams of the first and second Y-networks, when balanced, are angularly displaced relative to each other by an amount equal to the angle $\theta$ between base lines $D_1$ and $D_2$ of the hyperbolic navigation system mentioned hereinabove in Fig. 1. This vector relationship is clearly shown in Fig. 4, wherein the corresponding line voltage vectors $V_{AB}$ and $Vbc$ are displaced by the angle $\theta$. The magnitude of the attenuation of each of the networks 48, 50 and 52 may be such that the magnitude of the line voltage vector $V_{AB}$ is proportional to the baseline length $D_2$ of Fig. 1. In Fig. 4, the line voltage vectors of the second balanced Y-network is represented by $V_{AB}$, $V_{BC}$ and $V_{CA}$, respectively, and the phase voltage vectors are represented by $V_{NB}$, $V_{NC}$ and $V_{NA}$, respectively.

Connected across the terminals N—B of Y-network 41 there is provided a conventional rectifier circuit 62 adapted to produce an output current proportional to the magnitude of the phase voltage $V_{NB}$. The output current of rectifier circuit 62 is coupled to secondary winding 40 of saturable reactor 28 through primary winding 36. Similarly, connected across the terminal $n$—$b$ of Y-network 26 there is provided a conventional rectifier circuit 64 adapted to produce an output current proportional to the magnitude of the phase voltage $Vnb$. The output current of rectifier circuit 64 is coupled to secondary winding 58 of saturable reactor 44 through primary winding 56. By this dual feedback arrangement the magnitude of the phase voltage $V_{NB}$ controls the magnitude of the phase voltage of reactor 28 and the magnitude of the phase voltage $Vnb$ controls the magnitude of the phase voltage of reactor 44.

The phase voltages developed across secondary windings 38 and 40 of reactors 30 and 28, respectively ($Vnc$ and $Vnb$ of Fig. 4), are applied to a suitable subtractor circuit 66 to produce an output voltage equal to or proportional to the difference in the magnitudes of said phase voltages. The output difference voltage $|Vnc|-|Vnb|$ from subtractor circuit 66 is applied to a comparator circuit 68 to which is also applied one of the time conversion potentials $K_1$ from converter 12. Since such subtractor and comparator circuits are well known in the art, the detailed circuits thereof need not be shown. The potential $K_1$ and the difference voltage $|Vnc|-|Vnb|$ are simultaneously applied to comparator circuit 68 to provide an error signal voltage $e_1$ which is applied to rectifier circuit 72. Rectifier 72 is adapted to produce a current proportional to the magnitude of the error voltage $e_1$, the rectified current being coupled to secondary winding 38 of saturable reactor 30 through primary winding 34. Thus, by this arrangement the current through primary winding 34 controls the magnitude of the phase impedance of reactor 30.

Similarly, the outputs of phase voltages $V_{NA}$ and $V_{NB}$ of Y-network 41 are combined in subtractor circuit 74 to generate voltages equal to, or proportional to, the difference in the magnitude of these phase voltages. The difference voltage $|V_{NA}|-|V_{NB}|$ is applied to comparator circuit 76 to which is also applied the other of the time conversion potentials $K_2$. The potential $K_2$ and difference voltage $|V_{NA}|-|V_{NB}|$ are compared in comparator circuit 76 to provide an error voltage $e_2$ which is applied to rectifier circuit 78 adapted to produce a current proportional to the magnitude of said error voltage. This rectified current output is coupled to secondary winding 60 of saturable reactor 42 through primary winding 54. Thus, the direct current through primary winding 54 controls the magnitude of the phase impedance of reactor 42.

Figure 5:
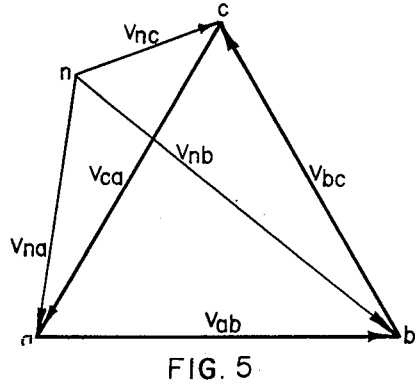
Fig. 5 is an explanatory vector diagram for an unbalanced three-phase load.

To better understand the operation of my invention, a brief description of three-phase circuit theory is presented at this point and reference is had to Figs. 3-6. The voltage vector diagram of a balanced three-wire Y-connected three-phase system is shown in Fig. 3. It is well known that under balanced conditions, the phase voltages $V_{nb}$, $V_{nc}$ and $V_{na}$ summate to zero and neutral point $n$, is symmetrically located. In the case of an unbalanced load, however, the line voltage vectors $V_{bc}$, $V_{ca}$ and $V_{ab}$ remain unaltered, while the phase voltages may assume any position in the plane of the vector diagram as shown in Fig. 5. In Fig. 5, the phase voltages no longer summate to zero and the neutral point $n$ is not symmetrically located. It can readily be seen that by proper selection of the phase impedances, the neutral point $n$ can be made to assume a position on any desired locus. If the locus for neutral point $n$ is chosen to be a member of a family of hyperbolas having its focal points at $b$ and $c$ of line voltage vector $V_{bc}$, then the difference in the magnitudes of the two phase voltages $V_{nb}$ and $V_{nc}$ must be made equal to some predetermined constant.

Thus, if $|V_{nb}|-|V_{nc}|$ be made equal to a constant $K_1$ and line vector $V_{bc}$ is scaled to equal base line $D_1$ of the hyperbolic navigation system shown in Fig. 1, then the first line of position of receiver 10 may be simulated by the electrical position of neutral point $n$ of Fig. 5. However, to establish a hyperbolic-fix, it is necessary to locate a second line of position. Simulation of this second station pair is accomplished by means of a second three-phase load which, when initially balanced, has an initial phase shift $\theta$ with respect to the vector voltage diagram of the first load which is identical to the angular displacement of $D_1$ and $D_2$ as shown in Fig. 1. This initial arrangement is shown vectorially in Fig. 4 where baseline $D_1$ (Fig. 1) is proportional to line voltage vector $V_{bc}$ and baseline $D_2$ (Fig. 2) is proportional to line voltage vector $V_{AB}$ and the angle between $V_{bc}$ and $V_{AB}$ is $\theta$.

Figure 6:
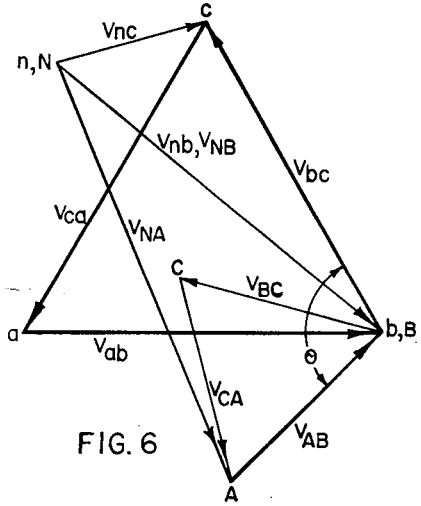
Fig. 6 illustrates the dynamic vector relationship of the phase voltages for establishing a hyperbolic-fix.

It is readily apparent that the neutral point N of the second balanced load will be the locus of the receiver 10 only if $|V_{NB}|-|V_{NA}|$ is made equal to a constant $K_2$. Obviously, if $$|V_{nb}|-|V_{nc}|=K_1$$
$$|V_{NB}|-|V_{NA}|=K_2$$

then neutral points $n$ and N will assume a common position in the plane of the vector diagram as shown in Fig. 6, and the location of receiver 10 may be thus readily determined. For purposes of discussion, the common neutral point under the above described condition will be referred to as a "floating neutral."

When converted potentials $K_1$ and $K_2$ are applied to the computer as shown, the vector diagram of Fig. 4 becomes unbalanced as shown in Fig. 6. The unbalanced phase voltage $V_{nb}$ developed across secondary winding 40 of saturable reactor 28 is coupled to rectifier 64 which, as described hereinabove, is adapted to produce a current proportional to $V_{nb}$. This output current is fed back to secondary winding 58 of saturable rector 44 through primary winding 56. Simultaneously, the unbalanced phase voltage $V_{NB}$ across secondary winding 58 is coupled to rectifier 62 which is adapted to produce a current proportional to $V_{NB}$. This output current is then fed back to secondary winding 40 of saturable reactor 28 through primary winding 36. Thus by means of this dual feedback arrangement, the phase voltage vectors $V_{nb}$ and $V_{NB}$ are maintained equal and constant, regardless of the variations in either or both of them.

Now, the phase voltages $V_{nb}$ and $V_{nc}$ are applied to subtractor circuit 66 to generate an output voltage equal to or proportional to the difference in magnitude of said phase voltages, namely, a voltage equal or proportional to $|V_{nb}|-|V_{nc}|$. This voltage is compared with potential $K_1$ in comparator circuit 68 to generate an error voltage $e_1$, which is rectified by rectifier circuit 72 to produce a current proportional to $e_1$. This current is fed back to secondary winding 38 through primary winding 34 to effectively vary phase impedance 30 in such a manner that error voltage $e_1$ is reduced to zero or nulled out. Obviously this condition satisfies the equation $$|V_{nb}|-|V_{nc}|=K_1$$

In a similar manner the difference voltage $|V_{NB}|-|V_{NA}|$ is combined with potential $K_2$ to develop an error voltage $e_2$ from comparator 76. A current proportional to $e_2$ is produced in rectifier 78 and this output current is fed back to secondary winding 60 through primary winding 54 to effectively vary the impedance 42 in such a manner that the error voltage $e_2$ is reduced to zero or nulled out. This condition satisfies the equation $|V_{NB}|-|V_{NA}|=K_2$.

By placing an appropriately calibrated meter M across either secondary winding 40 or 58 the exact distance of mobile receiver as represented by the "floating neutral" point may be readily determined. The bearings may be determined by utilizing suitable calibrated meters for measuring the relative phase between vectors $V_{NB}$ and $V_{NA}$ and the relative phase between $V_{nc}$ and $V_{nb}$.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a hyperbolic navigation system including a mobile receiver adapted to indicate the time difference of arrival of radio frequency signals from a master transmitter and at least two slave transmitters, said transmitters being so positioned that the baselines joining the master transmitter with each of said slave transmitters are angularly displaced; means for converting said time differences to corresponding discrete potentials; an analogue computer for simulating the geometry of said hyperbolic navigation system comprising a balanced three-phase line voltage source; first and second three-phase Y-connected impedance networks connected across said source, each of said Y-networks being initially balanced and having at least two impedances variable over a predetermined range, said networks being so constructed and arranged that the magnitude of the line voltage vector of one network is proportional to one of said baselines and the magnitude of the line voltage vector of the other network is proportional to the other of said baselines; means in circuit with the impedances of said first network whereby the line voltage vector diagram of said first network is angularly displaced with the line voltage vector diagram of said second network by an amount equal to the angular displacement of said baselines; means responsive to the phase voltages across the variable impedances of said first network for producing a first difference voltage proportional to the magnitude of the difference of said phase voltages when said first network is unbalanced; means for comparing said first difference voltage with one of said discrete potentials to produce a first error voltage; means responsive to said first error voltage for varying one of the variable impedances in said first network in a manner to null out said first error voltage; means responsive to the phase voltages across the variable impedances of said second network for producing a second difference voltage proportional to the magnitude of the difference of the phase voltages in said second network when said second network is unbalanced; means for comparing said second difference voltage with the other of said discrete potentials to produce a second error voltage; means responsive to said second error voltage for varying one of the variable impedances in said second network in a manner to null out said second error voltage; and means for maintaining the magnitude of the phase voltage across the other of said variable impedances in each of said network equal and constant at all times, said constant voltage being a function of the hyperbolic-fix of said mobile receiver.

2. The device set forth in claim 1 wherein said last mentioned means comprises a first feedback circuit responsive to the magnitude of the phase voltage across the other of said variable impedances in said first network, the output of said feedback circuit being coupled to the other of said variable impedances in said second network; and a second feedback circuit responsive to the magnitude of the phase voltage across the other of said variable impedances in said second network, the output of said second feedback circuit being coupled to the other of said variable impedances in said first network.

3. In a hyperbolic navigation system including a mobile receiver adapted to indicate the time difference of arrival of radio frequency signals from a master transmitter and at least two slave transmitters, said transmitters being so positioned that the baselines joining the master transmitter with each of said slave transmitters are angularly displaced; means for converting said time differences to corresponding discrete potentials; an analogue computer for simulating the geometry of said hyperbolic navigation system comprising a balanced three-phase line voltage source; first and second three-phase Y-connected impedance networks connected across said source, each of said Y-networks being initially balanced and having at least two impedances variable over a predetermined range, said networks being so constructed and arranged that the magnitude of the line voltage vector of one network is proportional to one of said baselines and the magnitude of the line voltage vector of the other network is proportional to the other of said baselines; means in circuit with the impedances of said first network whereby the line voltage vector diagram of said first network is angularly displaced with the line voltage vector diagram of said second network by an amount equal to the angular displacement of said baselines; a first subtractor circuit responsive to the phase voltages across each of the variable impedances of said first network for producing a first difference voltage proportional to the magnitude of the difference of said phase voltages when said first network is unbalanced; a first comparator circuit responsive to said first difference voltage and one of said discrete potentials to produce a first error voltage; a first rectifier circuit responsive to said first error voltage for producing a first direct current proportional to said first error voltage; means for coupling said first direct current to one of the variable impedances of said first network whereby the phase voltage across said one variable impedance is varied to null out said first error voltage; a second subtractor circuit responsive to the phase voltages across each of the variable impedances of said second network for producing a second difference voltage proportional to the magnitude of the difference of said phase voltages when said second network is unbalanced; a second comparator circuit responsive to said second difference voltage and the other of said discrete potentials to produce a second error voltage; a second rectifier circuit responsive to said second error voltage for producing a second direct current proportional to said second error voltage; means for coupling said second direct current to one of the variable impedances of said second network whereby the phase voltage across the one variable impedance of said second network is varied to null out said second error voltage; and means for maintaining the magnitude of the phase voltage across the other of said variable impedances in each of said networks equal and constant at all times, said constant voltage being a function of the hyperbolic-fix of said mobile receiver.

4. In a hyperbolic navigation system including a mobile receiver adapted to indicate the time difference of arrival of radio frequency signals from a master transmitter and at least two slave transmitters, said transmitters being so positioned that the baselines joining the master transmitter with each of said slave transmitters are angularly displaced; means for converting said time differences to corresponding discrete potentials; an analogue computer for simulating the geometry of said hyperbolic navigation system comprising a balanced three-phase line voltage source; first and second three-phase Y-connected impedance networks connected across said source, said network being so constructed and arranged that the magnitude of the line voltage vector of one network is proportional to one of said baselines and the magnitude of the line voltage vector of the other network is proportional to the other of said said baselines, each of said networks being initially balanced and having at least two impedances variable over a predetermined range, each of said variable impedances comprising saturable reactors having primary and secondary windings, said secondary windings being in circuit with said source; means in circuit with the impedances of said first network whereby the line voltage vector diagram of said first network is angularly displaced with the line voltage vector diagram of said second network by an amount equal to the angular displacement of said baselines; means responsive to the phase voltages across the secondary windings of said first network for producing a first difference voltage proportional to the magnitude of the difference of said phase voltages when said first network is unbalanced; means for comparing said first difference voltage with one of said discrete potentials to produce a first error voltage; means for rectifying said first error voltages to produce a first direct-current proportional thereto, said rectifying means having its output connected across the primary winding of one saturable reactor of said first network whereby said first direct current is fed back to the secondary winding of said one saturable reactor to null out said first error voltage; means responsive to the phase voltages across the secondary windings of said second network for producing a second difference voltage proportional to the magnitude of the difference of said phase voltages in said second network when said second network is unbalanced; means for comparing said second difference voltage with the other of said discrete potentials to produce a second error voltage; means for rectifying said second error voltage to produce a second direct current proportional thereto, said rectifying means having its output connected to a primary winding of one saturable reactor of said second network whereby said second direct current is fed back to the secondary winding of said one saturable reactor of said second network to null out said second error voltage; and dual feedback means in circuit with each of the primary windings of the other of said saturable reactors for maintaining the magnitude of the phase voltages across the secondary windings of said other saturable reactors equal and constant at all times.

5. The device set forth in claim 4 wherein said dual feedback means comprises a first rectifier responsive to the output phase voltage across the secondary winding of the other saturable reactor in said first network, the output of said first rectifier being connected to the primary winding of the other saturable reactor in said second network; and a second rectifier responsive to the output phase voltage across the secondary winding of the other saturable reactor in said second network, the output of said second rectifier being connected to the primary winding of the other saturable reactor in said first network.

6. An analogue computer adapted to simulate the position of a mobile receiver associated with a hyperbolic navigation system having a master transmitter and at least two slave transmitters; means operatively associated with said mobile receiver for producing two discrete potentials corresponding to the time difference of arrival of radio frequency signals from said transmitters; a balanced three-phase line voltage source; first and second three-phase Y-connected impedance networks connected across said source, said networks being initially balanced and having phase and amplitude characteristics to simulate the geometry of said hyperbolic navigation system, each of said networks having at least two impedances variable over a predetermined range; means for unbalancing said first network by one of said discrete potentials; means in circuit with the variable impedances of said first network for producing a first difference voltage proportional to the magnitude of the difference of the phase voltages across said variable impedances when said first network is unbalanced; means for comparing said first difference voltage with said one discrete potential to produce a first error voltage; means responsive to said first error voltage for varying one of the variable impedances in said first network in a manner to null out said error voltage; means for unbalancing said second network by the other of said discrete potentials; means in circuit with the variable impedances of said second network for producing a second difference voltage proportional to the magnitude of the difference in phase voltages across the variable impedances of said second network when said second network is unbalanced; means for comparing said second difference voltage with the other of said discrete potentials to produce a second error voltage; means responsive to said second error voltage for varying one of the variable impedances of said second network in a manner to null out said error voltage; and means for maintaining the magnitude of the phase voltage across the other of said variable impedances in each of said networks equal and constant at all times, said constant voltage being a function of the hyperbolic-fix of said mobile receiver.

No references cited.